(12) United States Patent
Sanfelice et al.

(10) Patent No.: US 9,876,442 B2
(45) Date of Patent: Jan. 23, 2018

(54) ROBUST SINGLE-PHASE DC/AC INVERTER FOR HIGHLY VARYING DC VOLTAGES

(71) Applicant: The Regents of the University of California, Oakland, CA (US)

(72) Inventors: Ricardo G. Sanfelice, Santa Cruz, CA (US); Jun Chai, Santa Cruz, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 14/879,630

(22) Filed: Oct. 9, 2015

(65) Prior Publication Data

US 2016/0105128 A1    Apr. 14, 2016

Related U.S. Application Data

(60) Provisional application No. 62/062,385, filed on Oct. 10, 2014.

(51) Int. Cl.
*H02M 7/5387* (2007.01)

(52) U.S. Cl.
CPC .................. *H02M 7/53871* (2013.01)

(58) Field of Classification Search
CPC .................. H02M 7/537; H02M 7/53871
USPC ............... 363/97, 35, 131; 323/906, 207
See application file for complete search history.

(56) References Cited

U.S. PATENT DOCUMENTS

| | | | |
|---|---|---|---|
| 4,093,900 A * | 6/1978 | Plunkett | B60L 7/003 318/370 |
| 4,615,000 A | 9/1986 | Fujii | |
| 5,428,522 A * | 6/1995 | Millner | H02M 7/53871 363/63 |
| 5,450,306 A | 9/1995 | Garces | |
| 5,959,430 A * | 9/1999 | Yuki | H02P 21/09 318/805 |
| 6,282,111 B1 * | 8/2001 | Illingworth | H02M 7/53871 363/132 |
| 6,411,534 B1 | 6/2002 | Kurnia | |
| 6,850,426 B2 * | 2/2005 | Kojori | H02P 23/0004 363/123 |

(Continued)

OTHER PUBLICATIONS

Received search report from EIC 2800 STIC searcher Benjamin Martin dated Sep. 28, 2016.*

*Primary Examiner* — Timothy J Dole
*Assistant Examiner* — Htet Z Kyaw
(74) *Attorney, Agent, or Firm* — Lumen Patent Firm

(57) ABSTRACT

A single-phase DC/AC inverter has a single-phase inverter bridge with binary switches connected to an RLC low-pass filter. Digital control logic in a control circuit (or in a microcontroller) determines and controls a logic state q determining the position of the switches in the inverter bridge from sensed $i_L$, $v_C$ values from the RLC filter. The control logic selects one of multiple possible logic states q based on whether the sensed $i_L$, $v_C$ values belongs one of multiple boundary regions of a tracking band in an $i_L$, $v_C$ state space.

4 Claims, 3 Drawing Sheets

(56) References Cited

U.S. PATENT DOCUMENTS

| | | | | |
|---|---|---|---|---|
| 7,262,981 | B2* | 8/2007 | Stevanovic | H02M 3/156 363/132 |
| 7,324,361 | B2* | 1/2008 | Siri | H02M 3/33592 363/95 |
| 7,397,150 | B2* | 7/2008 | Grossmann | H02P 7/04 307/140 |
| 7,990,745 | B2 | 8/2011 | Huang | |
| 8,031,495 | B2* | 10/2011 | Sachdeva | H02M 7/49 363/132 |
| 8,143,797 | B2 | 3/2012 | Yu | |
| 9,484,840 | B2* | 11/2016 | Amirahmadi | H02M 7/53873 |
| 9,490,719 | B2* | 11/2016 | Scandola | H02M 3/158 |
| 2005/0265058 | A1* | 12/2005 | Stevanovic | H02M 3/156 363/131 |
| 2008/0298104 | A1* | 12/2008 | Sachdeva | H02M 7/49 363/98 |
| 2010/0066283 | A1* | 3/2010 | Kitanaka | B60L 11/1803 318/400.02 |
| 2010/0265747 | A1* | 10/2010 | Egiziano | G05F 1/67 363/132 |
| 2011/0222326 | A1* | 9/2011 | Gray | H02M 7/53875 363/132 |
| 2014/0197774 | A1* | 7/2014 | Liu | H02M 1/126 318/721 |
| 2014/0268932 | A1 | 9/2014 | Gupta | |
| 2015/0062988 | A1* | 3/2015 | Amirahmadi | H02M 1/083 363/97 |
| 2015/0085552 | A1* | 3/2015 | Inomata | H02M 5/297 363/163 |
| 2015/0171729 | A1* | 6/2015 | Scandola | H02M 3/158 363/21.02 |
| 2015/0303829 | A1* | 10/2015 | Ilic | H02M 7/72 363/71 |

* cited by examiner

ROBUST SINGLE-PHASE DC/AC INVERTER FOR HIGHLY VARYING DC VOLTAGES

CROSS-REFERENCE TO RELATED APPLICATIONS

This application claims priority from U.S. Provisional Patent Application 62/062,385 filed Oct. 10, 2014, which is incorporated herein by reference.

STATEMENT OF GOVERNMENT SPONSORED SUPPORT

This invention was made with Government support under grant (or contract) no. FA9550-12-1-0366 awarded by the Air Force Office of Scientific Research, and under grant (or contract) no. ECS-1150306 awarded by the National Science Foundation. The Government has certain rights in the invention.

FIELD OF THE INVENTION

The invention relates generally to techniques for electrical power inversion. More specifically, it relates to methods and devices for DC/AC conversion.

BACKGROUND OF THE INVENTION

DC/AC inverters convert input DC power to output AC power. Typically, DC/AC inverters are controlled using pulse width modulation (PWM) techniques. Although these inverters have many uses, one example where DC/AC inverters play an important role is in photovoltaic energy systems. DC input power from photovoltaic arrays is converted to AC output power which is typically connected to a power grid and/or used to provide AC power to a residential or commercial building. One of the shortcomings of inverters using PWM-based controllers is that the output voltage magnitude is not robust to changes of the input DC voltage. However, the DC input can rapidly change in dependence upon weather related changes in solar irradiance of the photovoltaic array, causing unpredictable variations in the characteristics of the output AC power from the inverter. Significant problems can result from connecting such a variable AC power source to a power grid. To address this problem, a DC voltage regulator is often used at the inverter input, adding complexity and expense to the inverter. Another disadvantage of PWM-based controllers is that they result in relatively high harmonic distortions in the output. Circuitry to correct for this problem adds yet more complexity and expense to the inverter. These problems are not limited to DC/AC inverters for photovoltaic energy systems. The same problems apply to any application where stable AC power is needed but the DC power is unpredictable and highly varying. It would thus be an improvement in the art to provide a simple and robust power inverter that can provide stable AC output power even with unstable and/or highly varying input DC power.

SUMMARY OF THE INVENTION

In one aspect, the invention provides a single phase DC/AC inverter with a unique hybrid control circuit. Given an input DC voltage signal, the inverter produces an AC output signal that approximates a given sinusoidal AC reference signal. The control circuit uses measurements of the output voltage and current to control the four switches defining the single inverter.

The inverter solves the problem of robustly converting highly varying DC power into desired AC power. Advantageously, the precision with which the AC output signal approximates a desired reference signal can be adjusted via a tunable parameter in the control circuit, conversion is guaranteed under varying input voltages, and the harmonic distortion is almost entirely eliminated at low frequencies. The inverter can be implemented using existing hardware components. Specifically, the inverter may be implemented using a computer-controlled single-phase inverter bridge, a low pass filter, and voltage and current sensors. Consequently, it can be realized inexpensively.

According to embodiments of the invention, a single-phase DC/AC inverter includes a single-phase inverter bridge connected to two input DC terminals. The inverter bridge has a set of four signal-controllable binary switches. Connected to the single-phase inverter bridge is a series RLC low-pass filter with two AC output terminals. The inverter also includes a controller circuit with input lines from the RLC low-pass filter for sensing $i_L$, $v_C$ values of the RLC low-pass filter. The controller circuit also has output lines connected to the set of four signal-controllable binary switches for sending a logic state q control signal to the switches. Digital control logic in the control circuit outputs by the output lines the logic state q in response to the sensed $i_L$, $v_C$ values. The control logic switches the logic state q of the switches by selecting one of multiple possible logic states based on whether the sensed $i_L$, $v_C$ values intersect one of multiple boundary regions of a tracking band in an $i_L$, $v_C$ state space. The logic state q preferably has three possible logic states for the four switches $S_1$, $S_2$, $S_3$, $S_4$: q=1: $S_1$,$S_3$ ON and $S_2$,$S_4$ OFF, ii) q=−1: $S_1$,$S_3$ OFF and $S_2$,$S_4$ ON, and iii) q=0: $S_1$,$S_4$ OFF and $S_2$,$S_3$ ON. Further details regarding preferred embodiments of the invention will be described in more detail below in relation to the drawing figures.

DETAILED DESCRIPTION

Figure 1A:
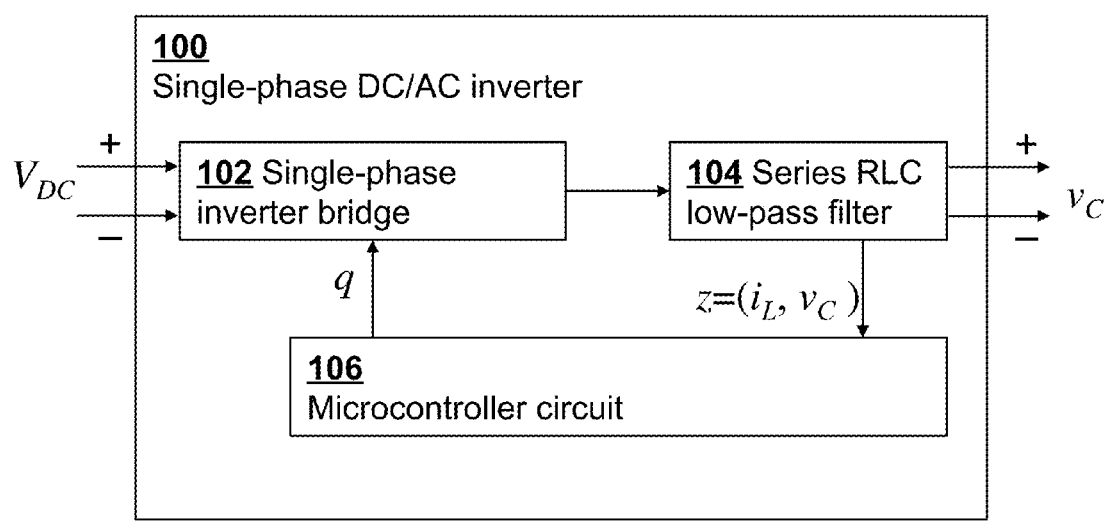
FIG. 1A is a schematic block diagram of a single-phase DC/AC inverter, according to an embodiment of the invention.
Figure 1B:
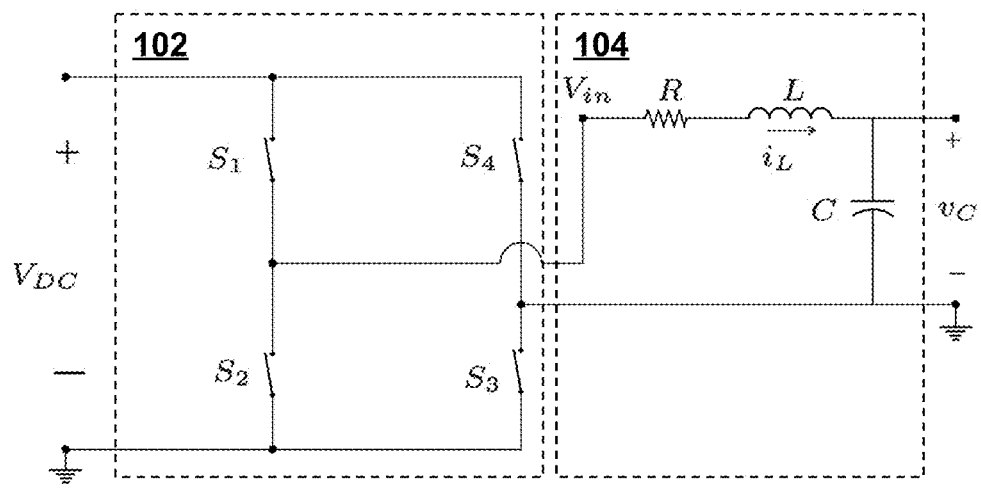
FIG. 1B is a schematic circuit diagram of a single-phase inverter bridge and RLC low-pass filter components of a DC/AC inverter, according to an embodiment of the invention.

A schematic block diagram of an embodiment of the invention is shown in FIGS. 1A and 1B. The single-phase DC/AC inverter 100 includes a single-phase inverter bridge 102 having a set of four signal-controllable switches $S_1$, $S_2$, $S_3$, $S_4$ connected to two DC terminals having an input DC voltage $V_{DC}$ across them. The input voltage $V_{DC}$ may be variable and unpredictable. Connected to the single-phase inverter bridge 102 is a series RLC low-pass filter 104 with two AC output terminals providing an output AC voltage. The RLC low-pass filter 104 has a resistor R, an inductor L, and a capacitor C, arranged in series as shown in FIG. 1B. The current through the inductor L is denoted $i_L$ and the voltage across the capacitor is denoted $v_C$ which is also the AC output voltage from the filter 104. During operation, the inverter 100 has a state characterized by a real-time pair of continuous values ($i_L$, $v_C$) which may be represented as a point $z=(i_L, v_C)$ in a two-dimensional state space. Because the values ($i_L$, $v_C$) vary continuously, the state space of the filter 104 is continuous. The inverter bridge 102, on the other hand, has a discrete state space of discrete ON-OFF values for the four switches $S_1$, $S_2$, $S_3$, $S_4$. Thus, the inverter is a hybrid discrete/continuous system.

The inverter also includes a hybrid controller circuit 106, as shown in FIG. 1A. The controller circuit 106 measures the sensed RLC filter state $z=(i_L, v_C)$ received though input lines from the filter 104. In response to the state $z=(i_L, v_C)$, digital control logic in the control circuit 106 determines a value of the logic state q of the switches in inverter bridge 102. The logic state q preferably has three possible states for the four switches: i) q=1: $S_1, S_3$ ON and $S_2, S_4$ OFF, ii) q=−1: $S_1, S_3$ OFF and $S_2, S_4$ ON, and iii) q=0: $S_1, S_4$ OFF and $S_2, S_3$ ON. Depending on the state q of the switches, the DC voltage provided from the inverter bridge 102 to the RLC filter 104 will be either $V_{DC}$, $-V_{DC}$, or 0. Discrete changes in the state of the switches 102 thus introduces non-smooth dynamics to the continuous state of the RLC filter 104.

The generated logic state q is sent by output lines from the controller circuit 106 to the inverter bridge 102 where its four signal-controllable switches are set to the received logic state q. The controller appropriately changes the logic state of the switches so that the AC output $v_C$ approximates a sinusoidal reference signal of a desired frequency. This control technique ensures that the inverter AC output is robust to large DC input variations that are typical in renewable energy sources. More specifically, the control logic switches the logic state q by selecting one of the three possible logic states based on whether the sensed ($i_L$, $v_C$) values map to one of six boundary regions of a tracking band in an ($i_L$, $v_C$) state space.

Controller 106 generates a discrete control based on a continuous input. It is an example of a hybrid controller. The control logic is configured using adjustable system parameters preferably determined before powering up the inverter. The tunable parameters affecting precision and robustness of the system include the parameters of the low-pass filter (values of the resistor, capacitor, and inductor) and the parameters of the control circuit (the constants defining the switching conditions). More specifically, the precision to which the AC voltage output approximates the reference signal, i.e., the width of the tracking band, is tunable by a parameter in the controller. The control logic can ensure that an AC output signal that approximates the reference will be generated for any DC input signal larger than a predetermined threshold, which can be tuned by the parameters of the circuit and of the controller. In addition, conversion is guaranteed even under highly varying DC input voltages. The control logic also ensures that close to zero harmonic distortion is present in the AC output at low frequencies.

Figure 2:
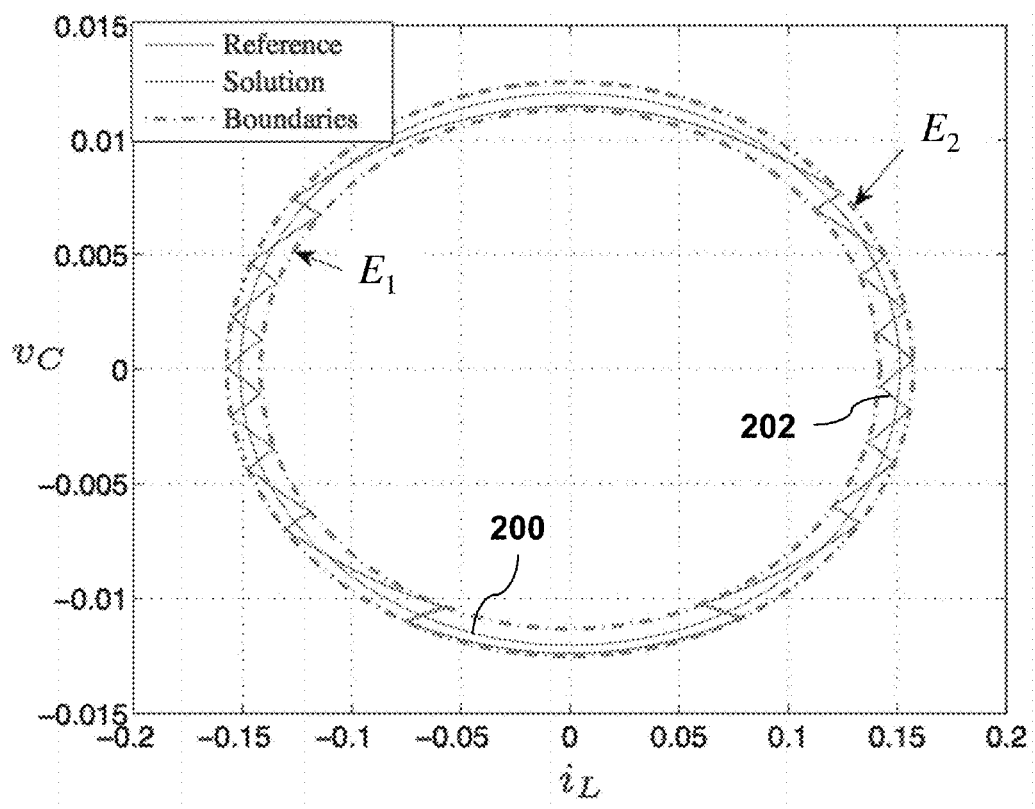
FIG. 2 is a phase portrait in the inductor current vs. voltage output plane for a DC/AC inverter, illustrating an elliptical reference trajectory and actual simulated solution trajectory contained within the tracking band boundaries, according to an embodiment of the invention.

The AC reference signal is the desired ideal AC output of the inverter, and it may be characterized by a closed elliptical path 200 in ($i_L$, $v_C$) state space, as shown in FIG. 2. Specifically, the reference signal is the steady-state response of the RLC filter to sinusoidal input $A \sin(\omega t+\theta)$, where A, $\omega$ and $\theta$ are parameters specifying the magnitude, angular frequency, and initial phase, of the desired ideal output of the inverter. The ellipse of the trajectory of the reference signal has its major and minor axes defined in terms of the parameters R, L, C, and $\omega$. Specifically, the reference signal path may be defined as the set of points $z=(i_L, v_C)$ satisfying $V(z)=c$ for some constant c, i.e., $\{z: V(z)=c\}$, where $V(z)$ is defined by $V(z)=(i_L/a)^2+(v_C/b)^2$, with constants a and b defined by $1/a^2=R^2+(L\omega-1/C\omega)^2$ and $a/b=C\omega$.

The tracking band is a band in ($i_L$, $v_C$) state space that contains the AC reference signal trajectory. The band may be defined, for example, as a neighborhood of the reference signal trajectory. For example, for two constants $c_1$ and $c_2$, such that $c_1<c<c_2$, the tracking band may be defined as the set of points $\{z: c_1<V(z)\leq c_2\}$, i.e., the set of points in ($i_L$, $v_C$) state space that are outside the boundary ellipse $E_1=\{z: V(z)=c_1\}$ but inside the boundary ellipse $E_2=\{z: V(z)=c_2\}$, as shown in FIG. 2. The width of the tracking band is represented by $|c_2-c_1|$ and is chosen according to the desired tracking precision, where a large width corresponds to low-precision tracking and a small width corresponds to a high-precision tracking An actual inverter state trajectory 202 resulting from the hybrid control technique of the present invention remains in the tracking band for all time while following a periodic orbit. The parameters of the example illustrated in FIG. 2 are R=0.6Ω, L=0.1 H, C=0.04 F, $V_{DC}$=5 V, $c_1$=0.9, $c_2$=1.1, and c=1.

The controller may be theoretically characterized using hybrid system theory, and it is designed to ensure that all states of the inverter within the tracking band remain within the tracking band and that states from outside the tracking back converge to the tracking band in finite time. Consequently, the inverter is ensured to exhibit global asymptotic stability of the tracking band, which, in turn, implies robustness to small perturbations and variation of the input voltage. The following control logic satisfies these conditions.

The general principle of the control logic is to appropriately change the discrete logic state q when the continuous state z encounters the inner or outer boundary of the tracking band. The new value for the logic state q depends on the particular portion of the boundary encountered as well as the current logic state of the switches. First, for a positive parameter $\epsilon$ we define the sets $$M_1=\{z: V(z)=c_2, 0\leq i_L\leq\epsilon, v_C\leq 0\} \text{ and}$$

$$M_2=\{z: V(z)=c_2, -\epsilon\leq i_L\leq 0, v_C\geq 0\}.$$

Figure 3A:
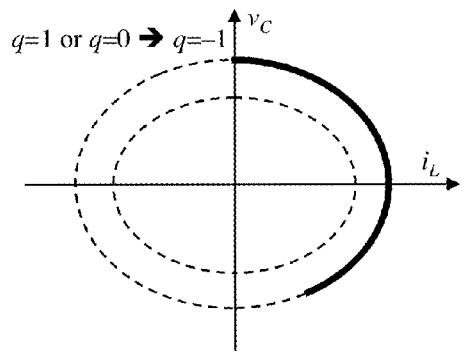
FIGS. 3A-F are phase portraits in the inductor current vs. voltage output of a DC/AC inverter, illustrating six boundary regions (bold) that correspond to changes in the logic state of inverter bridge switches, according to an embodiment of the invention.
Figure 3B:
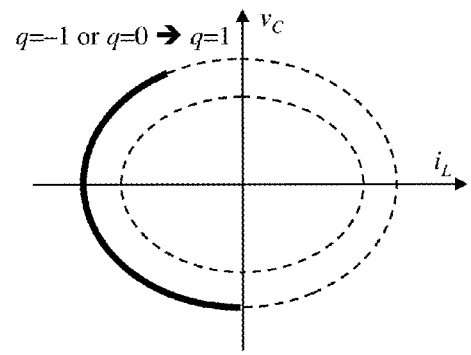
Figure 3C:
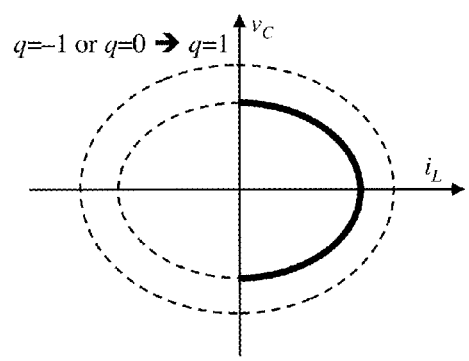
Figure 3D:
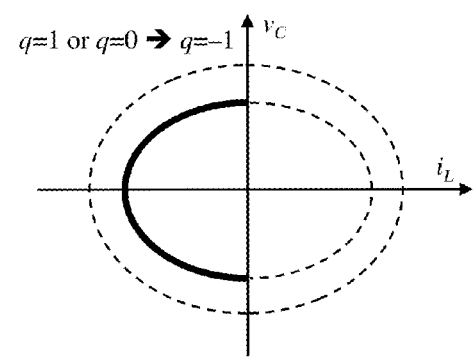
Figure 3E:
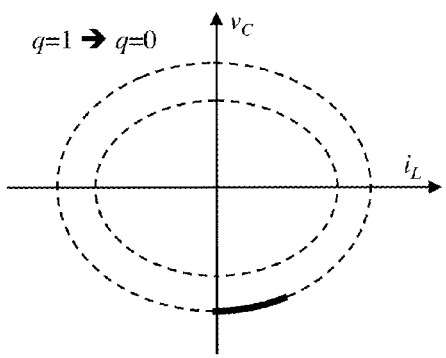
Figure 3F:
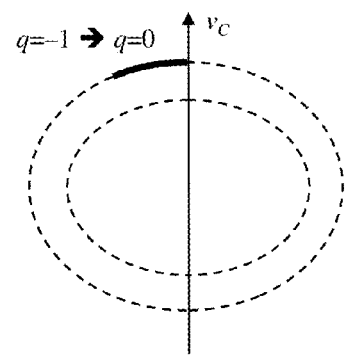

The parameter E should be chosen according to the width of the band and preferably to be less than 10% of the maximum output current (i.e., maximum horizontal displacement of ellipse $E_2$). The sets $M_1$ and $M_2$ correspond to two small arcs of the outer boundary ellipse $E_2$. Specifically, $M_1$ is an arc just to the right of the bottom of the ellipse (FIG. 3E), while $M_2$ is an arc just to the left of the top of the ellipse (FIG. 3F).

Using current values of z and q, the control logic selects a new value of q as follows:
 a) If $z\in E_2\setminus M_1$ and $i_L>0$ and $q\in\{1, 0\}$, then set q=−1.
 b) If $z\in E_2\setminus M_2$ and $i_L<0$ and $q\in\{-1, 0\}$, then set q=1.
 c) If $z\in E_1$ and $i_L>0$ and $q\in\{-1, 0\}$, then set q=1.
 d) If $z\in E_1$ and $i_L<0$ and $q\in\{1, 0\}$, then set q=−1.
 e) If $z\in M_1$ and q=1, then set q=0.
 f) If $z\in M_2$ and q=−1, then set q=0.
Otherwise, q remains the same.

This control logic is schematically illustrated in FIGS. 3A-F. Steps (c) and (d) determine the behavior when the state z encounters the inner boundary of the tracking band.

If the state z intersects the right half of the inner boundary of the band (FIG. 3C), then q is set to 1. If the state z intersects the left half of the inner boundary of the band (FIG. 3D), then q is set to −1. Steps (a), (b), (e), (f) determine the behavior when the state z encounters the outer boundary of the tracking band. If the state z intersects the right half of the outer boundary of the tracking band, then either q is set to 0 if it intersects the arc $M_1$ (FIG. 3E) or q is set to −1 otherwise (FIG. 3A). If the state z intersects the left half of the outer boundary of the tracking band, then either q is set to 0 if it intersects the arc $M_2$ (FIG. 3B) or q is set to −1 otherwise (FIG. 3F). Steps (e) and (f) of the control logic set the logic state to q=0 in order to prevent fast switching at the top and bottom extremes of the tracking band outer boundary, i.e., the points $\{z: V(z)=c_2, i_L=0\}$. Detection of the intersection of the state z with boundary arcs $M_1$ and $M_2$ of the tracking band can be implemented using zero-cross detection techniques so as to allow for noise in the measurements.

The inventors have discovered and demonstrated that this control logic guarantees stable DC/AC conversion, even with variable input DC signals, provided $LC\omega^2>1$ and $V_{DC}>b\sqrt{c_2}$. The example inverter state trajectory 202, for example, illustrates how the control logic switches the discrete state q when the continuous state z encounters an inner or outer boundary of the tracking band in order to ensure that the trajectory of the state z remains in the tracking band.

An inverter according to an embodiment of the present invention may be physically realized in various ways. For example, the inverter may be implemented as a programmable microcontroller equipped with analog to digital conversion (ADC) and PWM hardware, and either field effect (FET) or insulated gate (IGBT) transistors with corresponding gate drive circuitry forming the H bridge. In addition, the output stage of inverter is preferably based on the LC low-pass filter in an 'L' or 'T' configuration, with higher order filters providing faster roll-off at the expense of complexity and cost. The control logic can be implemented in place of conventional PWM control logic without modification to the existing hardware, e.g., by appropriately modifying the programmable microcontroller code.

The invention claimed is:

1. A single-phase DC/AC inverter comprising:
   two DC input terminals;
   a single-phase inverter bridge having a set of four signal-controllable switches switch one ($S_1$), switch two ($S_2$), switch three ($S_3$), and switch four ($S_4$) connected to the two DC input terminals, wherein a switching state of the four signal-controllable switches is referred to as a logic state (q);
   a series RLC low-pass filter connected to the single-phase inverter bridge;
   two AC output terminals connected to the series RLC low-pass filter; and
   a controller circuit comprising:
   input lines for sensing current and voltage values from an inductor and capacitor of the RLC low-pass filter;
   output lines for sending a logic state control signal to the set of four signal-controllable switches switch one ($S_1$), switch two ($S_2$), switch three ($S_3$), and switch four ($S_4$);
   digital control logic that outputs by the output lines the logic state (q) in response to the sensed current and voltage values,
   where the control logic switches the logic state (q) by selecting one of multiple possible logic states based on whether the sensed current and voltage values intersect one of multiple boundary regions of a tracking band in an a current-voltage state space.

2. The inverter of claim 1 wherein the control logic switches the logic state (q) by selecting one of three possible logic states based on whether the sensed current and voltage values map to one of six boundary regions of the tracking band in the current-voltage state space, wherein two of the boundary regions are boundaries of an inner boundary of the tracking band and four of the boundary regions are boundaries of an outer boundary of the tracking band.

3. The inverter of claim 1 wherein the control logic switches the logic state (q) by selecting one of the multiple possible logic states based additionally on a current logic state.

4. The inverter of claim 1 wherein the logic state (q) has three possible states
   i) logic state 1: switch one ($S_1$) is ON, switch two ($S_2$) is OFF, switch three ($S_3$) is ON, and switch four ($S_4$) is OFF,
   ii) logic state −1: switch one ($S_1$) is OFF, switch two ($S_2$) is ON, switch three ($S_3$) is OFF, and switch four ($S_4$) is ON,
   iii) logic state 0: switch one ($S_1$) is OFF, switch two ($S_2$) is ON, switch three ($S_3$) is ON, and switch four ($S_4$) is OFF.

* * * * *